(12) United States Patent
Adhikari et al.

(10) Patent No.: US 8,353,030 B2
(45) Date of Patent: Jan. 8, 2013

(54) MAINTAINING COMMUNICATION BETWEEN NETWORK NODES THAT ARE SUBJECTED TO A PACKET ATTACK

(75) Inventors: Akshay Adhikari, Basking Ridge, NJ (US); Sachin Garg, Green Brook, NJ (US); Anjur Sundaresan Krishnakumar, Rocky Hill, NJ (US); Navjot Singh, Denville, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1121 days.

(21) Appl. No.: 11/610,489

(22) Filed: Dec. 13, 2006

(65) Prior Publication Data
US 2008/0144613 A1 Jun. 19, 2008

(51) Int. Cl.
*G06F 21/00* (2006.01)
(52) U.S. Cl. ........................................... 726/22
(58) Field of Classification Search .................. 713/188; 726/21–25
See application file for complete search history.

(56) References Cited

U.S. PATENT DOCUMENTS

| | | | |
|---|---|---|---|
| 2002/0099967 A1* | 7/2002 | Kawaguchi | 713/323 |
| 2004/0015721 A1 | 1/2004 | Eastlake, III | |
| 2006/0114832 A1* | 6/2006 | Hamilton et al. | 370/244 |
| 2006/0220707 A1 | 10/2006 | Kang et al. | |
| 2006/0294588 A1* | 12/2006 | Lahann et al. | 726/23 |

FOREIGN PATENT DOCUMENTS
EP 1511219 A2 3/2005
WO 2006/135726 A2 12/2006

OTHER PUBLICATIONS

Weigt, "DE Application No. 10 2007 060 522.8-31 Office Action Feb. 25, 2010", , Publisher: DPMA, Published in: DE.
German Patent Application No. 10 2007 060 522.8, Avaya Technology LLC, Communication dated Apr. 4, 2012, 4 pages.

* cited by examiner

*Primary Examiner* — Brandon Hoffman
*Assistant Examiner* — Anthony Brown
(74) *Attorney, Agent, or Firm* — Maldjian Law Group LLC; John P. Maldjian, Esq.; Alexander D. Walter, Esq.

(57) ABSTRACT

A method is disclosed that enables mitigating at least some of the problems caused by a packet attack. When a first Internet Protocol (IP)-capable device is subjected to a packet attack, it indicates periodically to a second IP-capable device that certain communications with the first device are to be suspended. The periodic transmitting of the indication is performed at a slower rate than the keep-alive mechanism that is normally used to detect loss of connectivity. When the second device receives the transmitted indication, it refrains from transmitting keep-alive messages to the first device for a predetermined interval. Meanwhile, the first device also refrains from transmitting keep-alive messages to the second device for a similar interval. In transmitting the suspend indication, the illustrative embodiment seeks to prevent pairs of communicating devices that are experiencing packet attacks from continuing their operation under the erroneous assumption that each device is unavailable.

21 Claims, 8 Drawing Sheets

MAINTAINING COMMUNICATION BETWEEN NETWORK NODES THAT ARE SUBJECTED TO A PACKET ATTACK

FIELD OF THE INVENTION

The present invention relates to telecommunications in general, and, more particularly, to maintaining communication between two network nodes when one or both nodes are subjected to a packet attack.

BACKGROUND OF THE INVENTION

Voice over Internet Protocol (or "VoIP") features the routing of voice conversations over the Internet or through another type of Internet Protocol-based network. Voice signals from the voice conversations to be routed are digitized and formatted into data packets, which are then transmitted through the network. A telecommunications network that is based on VoIP is able to transmit voice conversations between devices that are able to access the network. FIG. 1 depicts a schematic diagram of telecommunications system 100 in the prior art, which is able to transmit voice conversations between end-user devices such as telephones. Telecommunications system 100 comprises:
  i. backbone packet network 101;
  ii. local area network (LAN) 102;
  iii. Internet Protocol-capable endpoints 103-1 through 103-R, wherein R is a positive integer;
  iv. gateways 104-1 through 104-S, wherein S is a positive integer;
  v. Public Switched Telephone Network (PSTN) 105;
  vi. PSTN telecommunications terminal 106; and
  vii. gatekeeper 107.
All of the elements depicted in FIG. 1 are interconnected as shown.

System 100 comprises a plurality of different types of networks, including backbone packet network 101, local area network 102, and Public Switched Telephone Network 105. Backbone packet network 101 comprises one or more transmission-related nodes such as routers that are used to direct data packets, in this case voice packets, from one or more sources to the correct destinations of those packets. Network 101 is capable of handling Internet Protocol-based messages that are transmitted between Internet Protocol-capable devices, such as endpoints 103-1 through 103-R, and gateways, such as gateways 104-1 through 104-S. Local area network (or "LAN") 102 provides for the local distribution of signals, such as in an enterprise system, and comprises networking equipment such as hubs, bridges, and switches between backbone packet network 101 and Internet Protocol-capable endpoints 103-1 through 103-R. LAN 102 operates in accordance with a networking protocol such as Ethernet or IEEE 802.3. Public Switched Telephone Network 105 comprises one or more transmission-related nodes such as switches that are used to direct call-related signals from one or more sources to the correct destinations of those signals. Network 105 is capable of handling either analog or digital bearer information in circuit-switched calls between devices such as PSTN terminal 106 and gateway 104-1.

Backbone network 101, as well as some of the depicted nodes, is governed by the H.323 protocol standard specified by the International Telecommunication Union. Nodes depicted in FIG. 1 that are governed by the H.323 standard include endpoints 103-1 through 103-R, gateways 104-1 through 104-S, and gatekeeper 107, which are described below. Some VoIP systems other than system 100 are governed by the Session Initiation Protocol (or "SIP") or a proprietary protocol.

Internet Protocol-capable endpoint 103-r, for r=1 through R, is a communication appliance such as a deskset, a conferencing unit, a wireless terminal, a desktop or portable computer (i.e., "softphone"), an Internet phone, and so forth. As depicted, endpoint 103-r operates in a local area network. Endpoint 103-r is capable of digitizing voice signals from its user and formatting the digitized signals into transmittable data packets through an audio compressor/decompressor (or "CODEC") circuit. Similarly, the CODEC circuit of endpoint 103-r is also capable of receiving data packets and converting the information contained within those packets into voice signals that are understandable by the endpoint's user.

Gateway 104-s, for s=1 through S, is a data-processing system that acts as a translator between two types of networks; for example, gateway 104-1 interconnects and acts as a translator between backbone packet network 101 and Public Switched Telephone Network 105. Because gateway 104-s connects two different types of networks together, one of its main functions is to convert between the different transmission and coding techniques used across the two networks. Gateway 104-1 is a Voice over Internet Protocol (VoIP)-capable gateway that performs the conversion between time division multiplexed voice signals that originate at a switched telephone network telecommunications terminal, such as terminal 106, and VoIP signals that are intended for an Internet Protocol network endpoint, such as one of IP-capable endpoints 103-1 through 103-R, as part of a telephone conversation between two parties. Gateway 104-1 performs the conversion in the reverse direction as well (i.e., from an IP terminal to a PSTN terminal) and is able to perform bidirectional conversion for multiple calls concurrently.

Gatekeeper 107 is a data-processing system that manages each collection of IP-capable endpoint devices that belong to a particular zone. Gatekeeper 107 provides address translation and routing for the IP-capable devices in their zone. In addition, gatekeeper 107 provides the call admission control, in terms of specifying which of IP-capable devices 103-1 through 103-R may call which other devices in telecommunications system 100.

Gatekeeper 107 receives one or more registration messages from each Internet Protocol-capable endpoint 103-r when the endpoint first connects to the network. The registration message indicates the current IP address of the endpoint and enables endpoint 103-r to use the network, such as to make a call. When the user of endpoint 103-r desires to make a call, the endpoint transmits a message that includes the destination telephone number. After network 101 determines which gateway the destination telephone number corresponds to, gatekeeper 107 transmits the address of the destination gateway to the calling endpoint 103-r. The endpoint then can send packets directly to the gateway (e.g., gateway 104-1, etc.), and the gateway initiates a local call to the destination telephone (e.g., terminal 106, etc.).

As can be seen from the call-control scenario just described, it is crucial for each endpoint 103-r and gatekeeper 107 to maintain an ongoing awareness of each other and an ongoing ability to communicate with each other. To maintain this ongoing relationship with each other, each endpoint 103-r exchanges a "heartbeat" message with gatekeeper 107. A loss of the heartbeat would prompt the affected endpoint to rediscover a gatekeeper or would prompt the affected gatekeeper to deregister the endpoint, or both.

FIG. 2 depicts such a heartbeat mechanism in the prior art, in which endpoint 103-1 is the instigator of the heartbeat sequence and gatekeeper 107 responds to each heartbeat message that it receives from endpoint 103-1. Note that gatekeeper 107 can also be the instigator of a heartbeat sequence with endpoint 103-1, or with a different endpoint, but that is not shown here. As depicted, endpoint 103-1 has been transmitting a series of normal "keep-alive" packets, such as packet 201, and in response to each keep-alive packet, gatekeeper 107 has transmitted an acknowledgment packet, such as packet 202. Endpoint 103-1 transmits the keep-alive packets at regular, predetermined intervals. If endpoint 103-1 does not receive an acknowledgment packet in response to a keep-alive packet, such as with keep-alive packet 203, the endpoint commences transmitting retry keep-alive packets, such as packets 204 through 207, but at a faster rate than before. If the retry keep-alive packets go unanswered, endpoint 103-1 eventually deregisters and goes into a discovery mode at event 208, in which it attempts to find and reregister with a gatekeeper.

The heartbeat-based reliability technique described above works well under ordinary conditions. However, in a non-ordinary condition endpoint 103-$r$ or gatekeeper 107, or both, can be subjected to what is known as a "packet attack," sometimes referred to as a "Denial-of-Service attack," in which an intruder can target one or more devices and continuously transmit, at a high rate, packets that are addressed to the targeted device. If a device, such as endpoint 103-$r$ or gatekeeper 107, is under a packet attack, the device might not have enough processing power to continue to generate or process heartbeats. If endpoint 103-$r$ is targeted, gatekeeper 107 will eventually deregister endpoint 103-$r$, which will then go into discovery mode to reregister with a gatekeeper. As implied above, the absence of a heartbeat leads to additional message traffic in the network and increases the processing load on gatekeeper 107, which possibly degrades its performance and reduces its overall availability to the other nodes in system 100. Furthermore, if a large number of endpoints were to reregister concurrently, a flood of registration-related messages would occur, creating an even higher load on gatekeeper 107 and ultimately leading to degraded performance across system 100.

What is needed is a technique to mitigate the problems that a packet attack causes, without some of the disadvantages in the prior art.

SUMMARY OF THE INVENTION

The present invention enables mitigating at least some of the problems caused by a packet attack, without some of the disadvantages in the prior art. In particular, when a first Internet Protocol (IP)-capable device is subjected to a packet attack, it indicates periodically to a second IP-capable device that certain communications with the first device are to be suspended. In accordance with the illustrative embodiment of the present invention, the periodic transmitting of the indication is performed at a slower rate than the keep-alive mechanism that is normally used to detect loss of connectivity. When the second device receives the transmitted indication, it refrains from transmitting keep-alive messages to the first device for a predetermined interval. Meanwhile, the first device also refrains from transmitting keep-alive messages to the second device for a similar interval. By transmitting each suspend packet, which acts as a directive to the second device to preserve its awareness of the first device's operational state, the illustrative embodiment seeks to prevent pairs of communicating devices that are experiencing packet attacks from continuing their operation under the erroneous assumption that each device is unavailable.

The tasks that are part of mitigating the packet attack problem are described here. First, a device in the telecommunications system of the illustrative embodiment detects a packet attack. A secure, reliable channel is then opened between the first device, such as an endpoint, and the second device, such as a gatekeeper. Periodically, the first device transmits a suspend packet to keep the operational state of the first device preserved (i.e., "frozen") at the second device, where the state of the first device can indicate, for example, whether the first device is registered at the second device. The second device sends an acknowledgment packet back to the first device and suspends the transmission of keep-alive packets to the first device. When the first device receives the acknowledgment packet, it too can refrain from transmitting keep-alive packets to the second device for a predetermined duration, referred to as the "back-off period." Each device will stop transmitting keep-alive messages to the other device and wait for the packet attack to finish. If the packet attack continues past the current back-off period, the first device will send additional suspend packets as needed. Once the first device detects, or is notified, that the attack is over, it sends a resume packet to the second device. At this point, the normal heartbeat state machine resumes at the first device, and the second device can also choose to resume its heartbeat state machine.

In some embodiments, the IP-capable device of the illustrative embodiment can blunt the immediate effect of the packet attack by using mechanisms in addition to those of the technique of the illustrative embodiment. For example, the device can disable the local area network interface through which the packet attack stream arrives; this has the effect of conserving processing cycles instead of expending processing cycles to deal with the attack stream.

The illustrative embodiment of the present invention comprises: detecting a packet attack that affects a first Internet Protocol-capable device; and transmitting, based on the detection of the packet attack, a first packet from the first Internet Protocol-capable device to a second Internet Protocol-capable device with which the first Internet Protocol-capable device has been exchanging a plurality of heartbeat-related packets that comprises a series of keep-alive packets; wherein the first packet indicates that the second Internet Protocol-capable device is to suspend the transmission of additional heartbeat-related packets to the first Internet Protocol-capable device.

DETAILED DESCRIPTION

Figure 3:
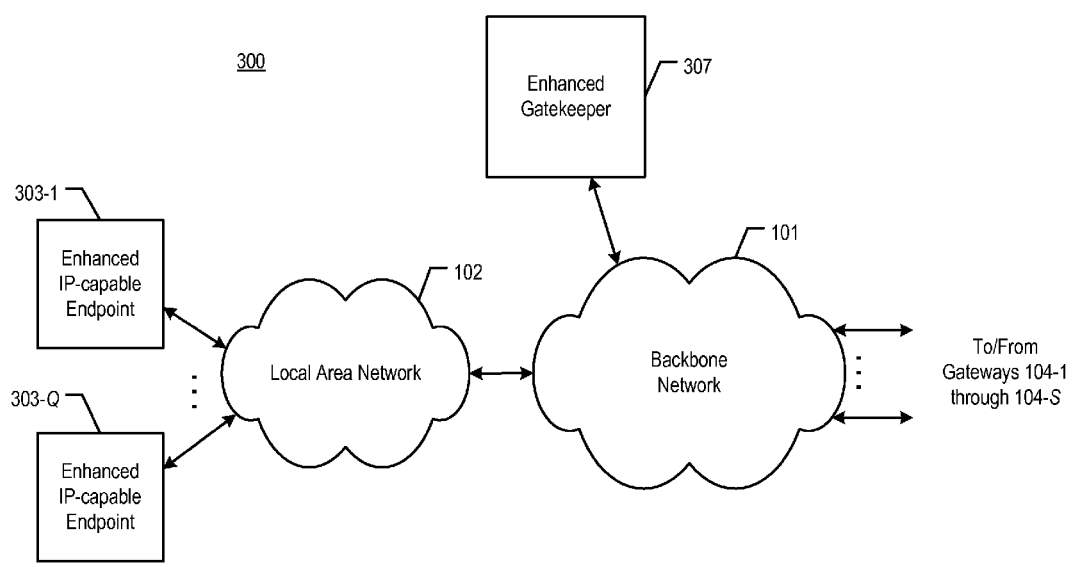
FIG. 3 depicts a schematic diagram of telecommunications system 300 in accordance with the illustrative embodiment of the present invention.

FIG. 3 depicts a schematic diagram of telecommunications system 300 in accordance with the illustrative embodiment of the present invention. Telecommunications system 300 comprises:

i. backbone packet network 101;
    ii. local area network 102;
    iii. enhanced Internet Protocol-capable endpoints 303-1 through 303-Q, wherein Q is a positive integer; and
    iv. enhanced gatekeeper 307.

Figure 1:
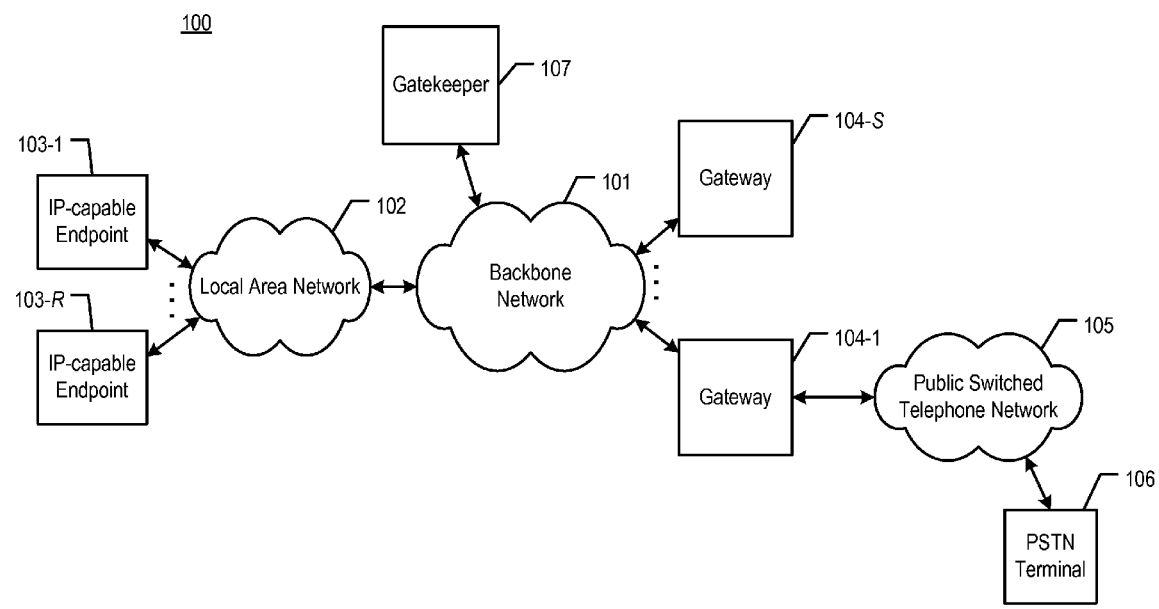
FIG. 1 depicts a schematic diagram of telecommunications system 100 in the prior art.

All of the elements depicted in FIG. 3 are interconnected as shown. In addition, system 300 comprises gateways 104-1 through 104-S, Public Switched Telephone Network (PSTN) 105, and PSTN telecommunications terminal 106, all of which are described above and with respect to FIG. 1, as are backbone packet network 101 and local area network 102.

System 300 is similar to system 100 in that it is able to transmit voice conversations between end-user devices. However, as those who are skilled in the art will appreciate, in some alternative embodiments of the present invention, the present invention is also well-suited for telecommunications systems that transmit other types of bearer information than voice, such as video.

Furthermore, as those who are skilled in the art will appreciate, telecommunications system 300 is capable in some alternative embodiments of handling other types of networks and other combinations of networks than depicted. In some alternative embodiments, each network might in turn comprise additional networks, such as cellular telephone networks and local area networks that are either wired or wireless.

In accordance with the illustrative embodiment, backbone network 101 is governed by the H.323 protocol standard specified by the International Telecommunication Union. Enhanced endpoints 303-1 through 303-Q and enhanced gatekeeper 307, which are described below, are also governed by the H.323 standard. As those who are skilled in the art will appreciate, in some alternative embodiments, some or all of system 300 can be governed by a different protocol such as the Session Initiation Protocol (or "SIP"), either proprietary or standardized.

Enhanced Internet Protocol-capable endpoint 303-$q$, for q=1 through Q, is a communication appliance such as a deskset, a conferencing unit, a cellular telephone, a desktop or portable computer (i.e., "softphone"), and so forth. The salient components of endpoint 303-$q$ are described below and with respect to FIG. 4. As depicted, endpoint 303-$q$ operates in a local area network, but in some alternative embodiments the endpoint operates in a different type of network. Endpoint 303-$q$ is capable of digitizing voice signals from its user and formatting the digitized signals into transmittable data packets through an audio compressor/decompressor (or "CODEC") circuit. Similarly, the CODEC circuit of endpoint 303-$q$ is also capable of receiving data packets and converting the information contained within those packets into voice signals that are understandable by the endpoint's user.

In addition, endpoint 303-$q$ is capable of performing the tasks described below and with respect to FIGS. 6 through 8, in accordance with the illustrative embodiment of the present invention. It will be clear to those skilled in the art, after reading this specification, how to make and use enhanced Internet Protocol-capable endpoint 303-$q$.

Enhanced gatekeeper 307 is a data-processing system that manages each collection of IP-capable endpoint devices that belong to a particular zone. The salient components of gatekeeper 307 are described below and with respect to FIG. 5. Gatekeeper 307 provides address translation and routing for the IP-capable devices in their zone. In addition, gatekeeper 307 provides the call admission control, in terms of specifying which of enhanced Internet Protocol-capable devices 303-1 through 303-Q may call which other devices in telecommunications system 300. Although one gatekeeper is depicted, additional gatekeepers can be present, as those who are skilled in the art will appreciate.

In addition, endpoint 303$q$ is capable of performing the tasks described below and with respect to FIGS. 6 through 8, in accordance with the illustrative embodiment of the present invention. It will be clear to those skilled in the art, after reading this specification, how to make and use enhanced Internet Protocol-capable endpoint 303-$q$.

Figure 2:
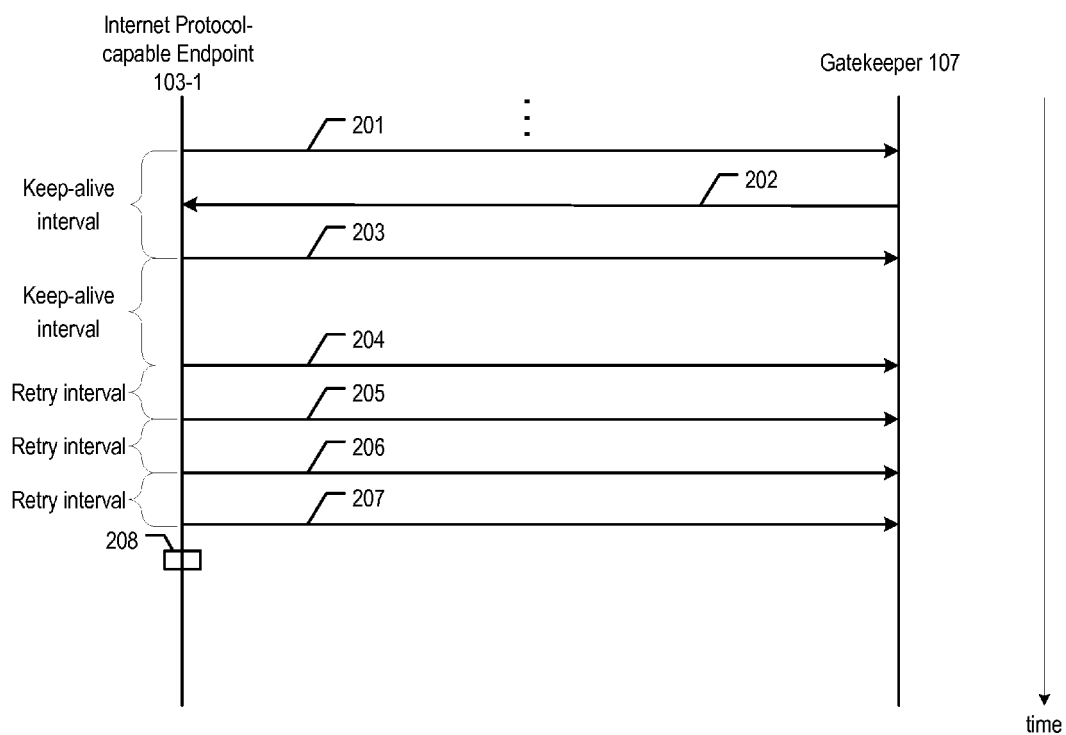
FIG. 2 depicts a heartbeat mechanism in the prior art.

To maintain the ability to communicate with each other during periods of ordinary packet traffic, each endpoint 303-$q$ exchanges a "heartbeat" message with its gatekeeper (e.g., gatekeeper 307, etc.), as described above and with respect to FIG. 2 for endpoint 103-$r$ and gatekeeper 107. In accordance with the illustrative embodiment, endpoint 303-$q$ and gatekeeper 307 exchange heartbeat-related packets and execute the tasks of the illustrative embodiment. However, as those who are skilled in the art will appreciate, in some alternative embodiments, other packet-based devices can exchange heartbeat-related signals, as well as execute the tasks described below and with respect to FIGS. 6 through 8.

Figure 4:
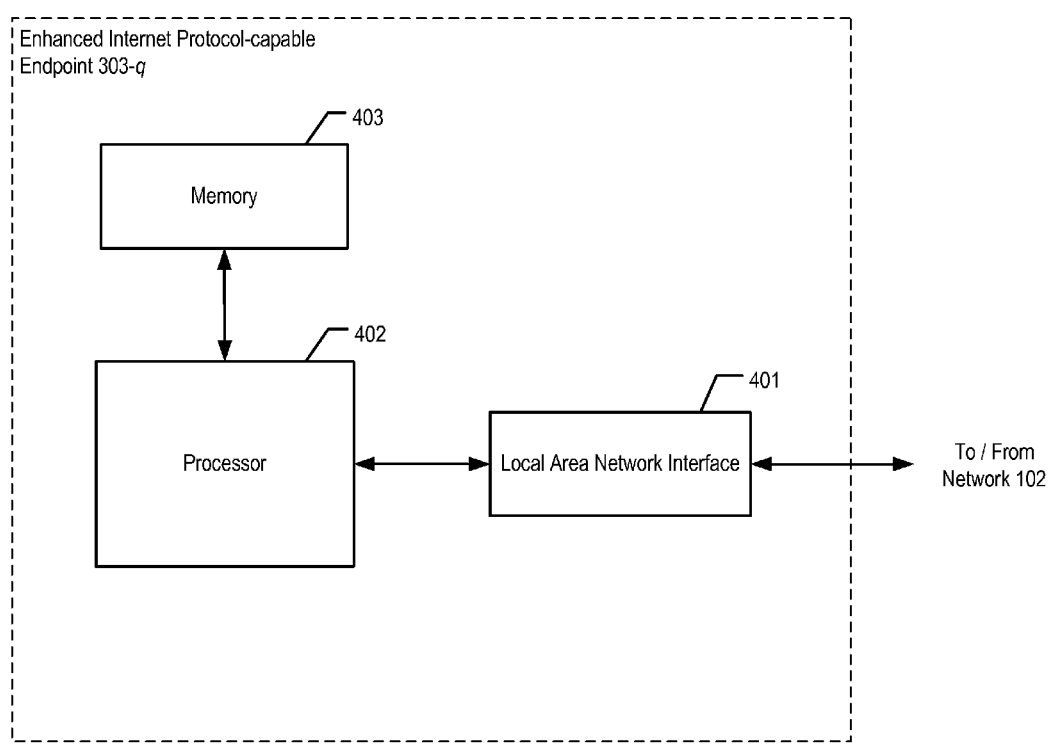
FIG. 4 depicts the salient components of enhanced Internet Protocol-capable endpoint 303-$q$ of system 300.

FIG. 4 depicts the salient components of enhanced Internet Protocol-capable endpoint 303-$q$ in accordance with the illustrative embodiment of the present invention. Endpoint 303-$q$ comprises local area network (LAN) interface 401, processor 402, and memory 403, interconnected as shown.

LAN interface 401 is capable of receiving packet signals from local area network 102, such as incoming packets from other Internet Protocol-capable devices, and of forwarding the information encoded in the signals to processor 402, in well-known fashion. LAN interface 401 is also capable of receiving information from processor 402 and of transmitting signals that encode this information to other Internet Protocol-capable devices via local area network 102, in well-known fashion. It will be clear to those skilled in the art, after reading this specification, how to make and use LAN interface 401.

Processor 402 is a general-purpose processor that is capable of receiving information from interface 401, executing instructions stored in memory 403, reading data from and writing data into memory 403, executing the tasks described below and with respect to FIGS. 6 through 8, and transmitting information to interface 401. In some alternative embodiments of the present invention, processor 402 might be a special-purpose processor. In either case, it will be clear to those skilled in the art, after reading this specification, how to make and use processor 402.

Memory 403 stores the instructions and data used by processor 402. Memory 403 might be any combination of dynamic random-access memory (RAM), flash memory, disk drive memory, and so forth. It will be clear to those skilled in the art, after reading this specification, how to make and use memory 403.

Figure 5:
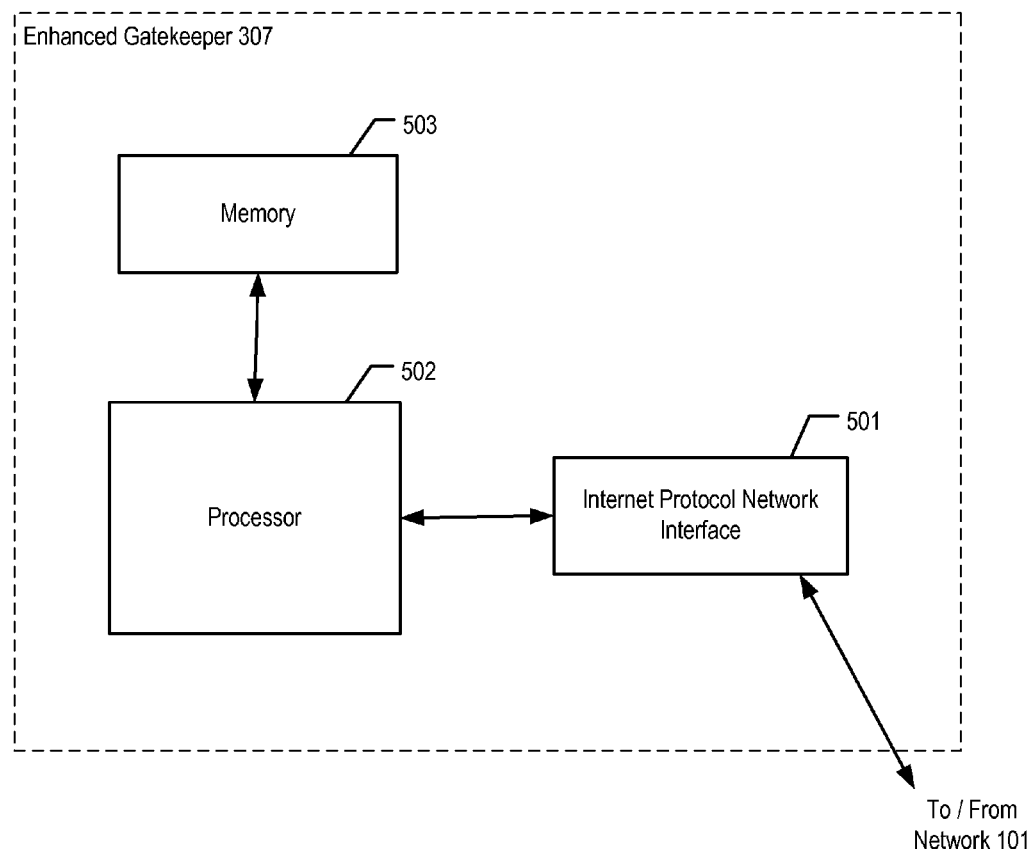
FIG. 5 depicts the salient components of enhanced gatekeeper 307 of system 300.

FIG. 5 depicts the salient components of enhanced gatekeeper 307 in accordance with the illustrative embodiment of the present invention. Gatekeeper 307 comprises Internet Protocol network interface 501, processor 502, and memory 503, interconnected as shown.

Internet Protocol network interface 501 is capable of receiving packet signals from backbone network 101, such as incoming packets from other Internet Protocol-capable devices, and of forwarding the information encoded in the signals to processor 502, in well-known fashion. Internet Protocol interface 501 is also capable of receiving information from processor 502 and of transmitting signals that encode this information to other Internet Protocol-capable devices via backbone packet network 101, in well-known fashion. It will be clear to those skilled in the art, after reading this specification, how to make and use Internet Protocol network interface 501.

Processor 502 is a general-purpose processor that is capable of receiving information from interface 501, executing instructions stored in memory 503, reading data from and writing data into memory 503, executing the tasks described below and with respect to FIGS. 6 through 8, and transmitting information to interface 501. In some alternative embodiments of the present invention, processor 502 might be a special-purpose processor. In either case, it will be clear to those skilled in the art, after reading this specification, how to make and use processor 502.

Memory 503 stores the instructions and data used by processor 502. Memory 503 might be any combination of dynamic random-access memory (RAM), flash memory, disk drive memory, and so forth. It will be clear to those skilled in the art, after reading this specification, how to make and use memory 503.

Figure 6:
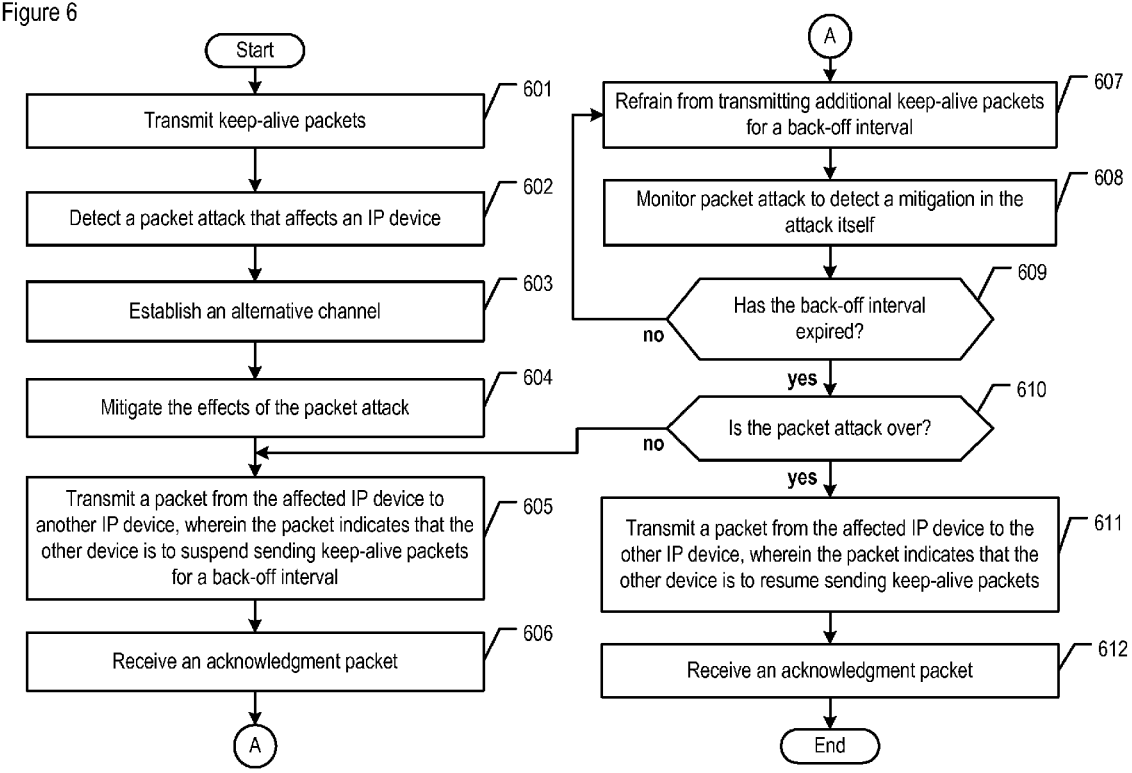
FIG. 6 depicts a flowchart of the salient tasks that are executed by a first Internet Protocol-capable device, in accordance with the illustrative embodiment of the present invention.
Figure 7:
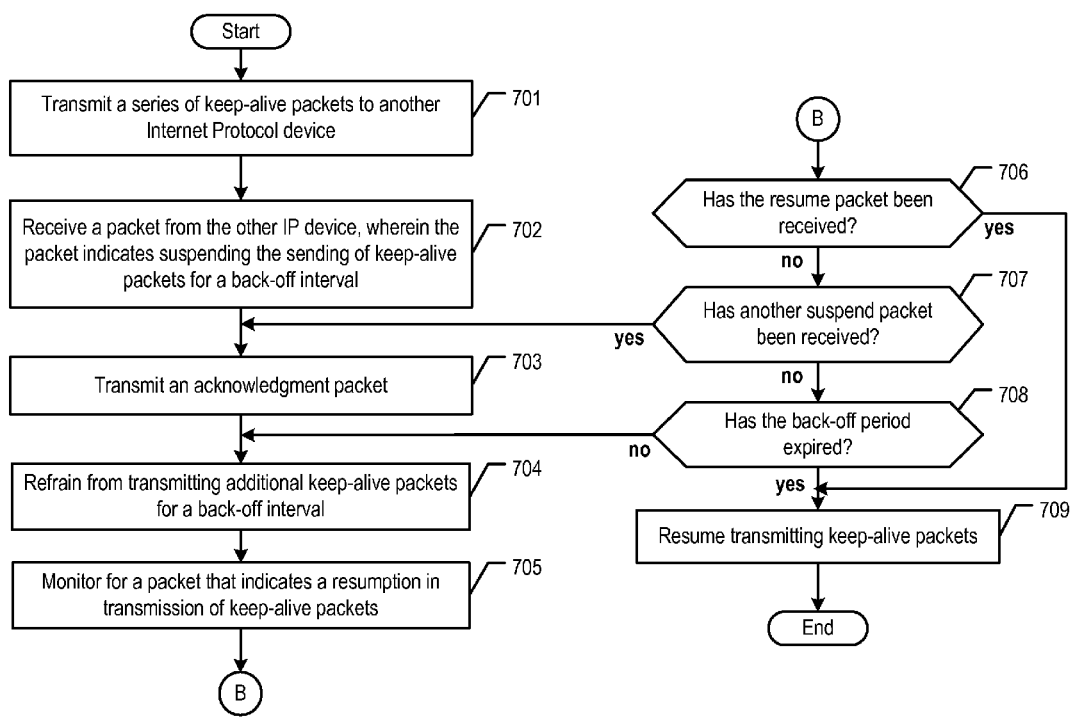
FIG. 7 depicts a flowchart of the salient tasks that are executed by a second Internet Protocol-capable device, in accordance with the illustrative embodiment of the present invention.
Figure 8:
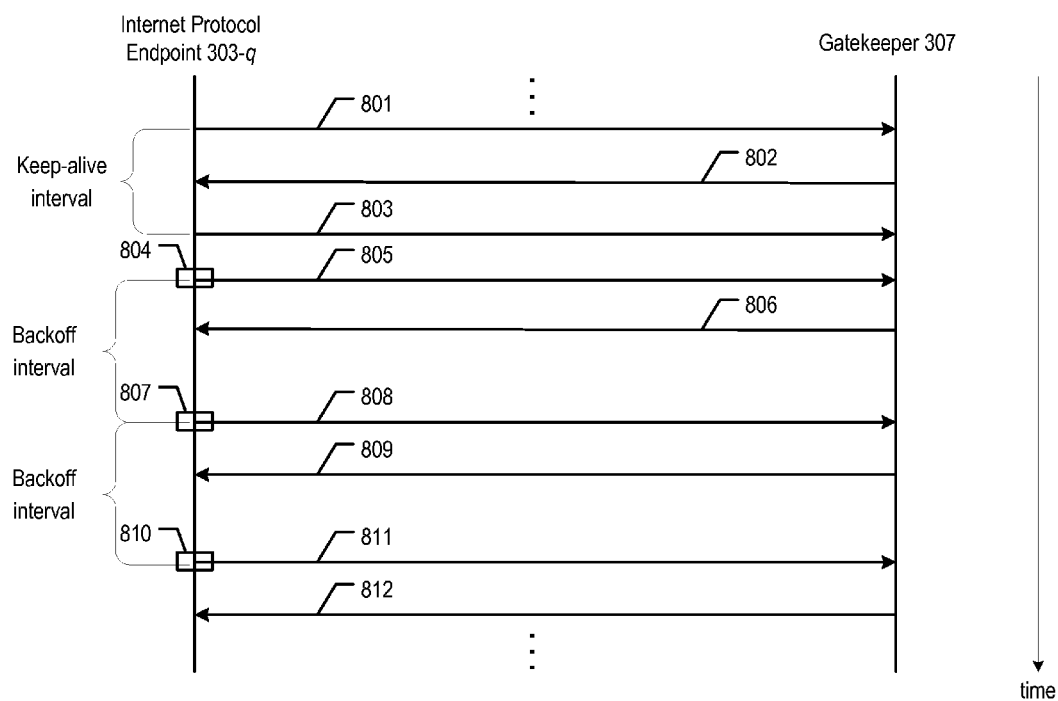
FIG. 8 depicts a message flow diagram of the combination of some of the messages and events that are depicted in FIGS. 6 and 7.

FIGS. 6 and 7 depict flowcharts of salient tasks performed in responding to a packet attack on one of both of enhanced Internet Protocol-capable endpoint 303-*q* and enhanced gatekeeper 307. In particular, the tasks in FIG. 6 are associated with transmitting one or more packets that indicate that the device receiving those packets is to suspend transmitting keep-alive packets. The tasks in FIG. 7 are associated with receiving one or more packets that indicate suspending the transmission of keep-alive packets. In addition, FIG. 8 depicts a message flow diagram of the combination of some of the messages and events that are depicted in FIGS. 6 and 7.

As those who are skilled in the art will appreciate, some of the tasks that appear in FIGS. 6 and 7 can be performed in parallel or in a different order than that depicted. Furthermore, as those who are skilled in the art will appreciate, multiple pairs of Internet Protocol-capable devices throughout telecommunications system 300 that exchange heartbeat packets with each other can concurrently perform the tasks described with respect to FIGS. 6 and 7. For example, endpoint 303-1 can perform the tasks in FIG. 6 while its gatekeeper can perform the tasks in FIG. 7; concurrently, endpoint 303-2 can also perform the tasks in FIG. 6 while its gatekeeper, possibly the same one as for endpoint 303-1 or a different one, can perform the tasks in FIG. 7. In addition, each device in a particular pair of devices might perform the tasks in both FIGS. 6 and 7; for example, endpoint 303-3 might perform the tasks in FIG. 6 while gatekeeper 307 performs the corresponding tasks in FIG. 7, and gatekeeper 307 might perform the tasks in FIG. 6 while endpoint 303-3 performs the corresponding tasks in FIG. 7. Finally, a single device such as gatekeeper 307 might perform the tasks in FIG. 6 or FIG. 7, or both, with more than one other device, such as with multiple endpoints.

FIG. 6 depicts a flowchart of the salient tasks that are executed by a first Internet Protocol-capable device, in accordance with the illustrative embodiment of the present invention. For pedagogical purposes, the tasks associated with FIG. 6 are described below as being performed by enhanced Internet Protocol-capable endpoint 303-1; however, as those who are skilled in the art will appreciate, a different device can perform the tasks as shown.

At task 601, endpoint 303-1 transmits a series of keep-alive packets to another Internet Protocol-capable device in well-known fashion; in the illustrative example, endpoint 303-1 transmits the series to gatekeeper 307. In FIG. 8, packet 801 is one such keep-alive packet that endpoint 303-1 transmits and is acknowledged by packet 802.

At task 602, a device in telecommunications system 300 detects a packet attack that affects at least endpoint 303-1. For example, the packet attack prevents endpoint 303-1 from receiving an acknowledgment packet in response to keep-alive packet 803. In some embodiments, endpoint 303-1 detects the attack, at event 804, while in some other embodiments a different device than endpoint 303-1, such as a separate intrusion detection system, detects the attack and reports the attack to endpoint 303-1.

At task 603, endpoint 303-1 establishes a secure reliable channel (i.e., a separate channel than the one used to exchange heartbeat-related packets) with gatekeeper 307, in well-known fashion. The channel can be direct or through a third Internet Protocol-capable device, such as the intrusion detection system.

At task 604, a device in system 300 attempts to mitigate the effects of the packet attack on endpoint 303-1. For example, if endpoint 303-1 itself attempts to mitigate the attack, it can do so by disabling local area network interface 401 over which the attacking packets are being received so that few processor cycles are used in dealing with the attack.

At task 605, endpoint 303-1 transmits packet 805 to gatekeeper 307, which packet indicates that gatekeeper 307 is to suspend the transmission of additional heartbeat-related packets (keep-alive packets) to endpoint 303-1. In some embodiments, the suspend packet indicates that gatekeeper 307 is to suspend the transmission of the additional packets for a predetermined length of time; this length of time is longer than the time between two consecutive non-retry packets in the series of keep-alive packets ordinarily sent. The length of time, in some embodiments, is based on the type of packet attack being experienced. In some other embodiments, the length of time is based on the severity of the packet attack. As those who are skilled in the art will appreciate, in still some other embodiments, the length of time can be based on yet another characteristic of the packet attack or on something else within system 300.

At task 606, endpoint 303-1 receives acknowledgment packet 806 from gatekeeper 307, in response to having transmitted the suspending packet at task 605.

At task 607, endpoint 303-1 refrains from transmitting additional keep-alive packets to gatekeeper 307 for a particular back-off interval. The back-off interval is based on the predetermined length of time that is longer than the time between two consecutive non-retry packets in the series of keep-alive packets that are ordinarily transmitted to maintain the heartbeat with gatekeeper 307. The predetermined length of time can be based on one or more characteristics, as described above and with respect to task 605.

At task 608, a device in telecommunications system 300 monitors the packet attack to detect if the attack is mitigating. In accordance with the illustrative embodiment endpoint 303-1 monitors the attack, while in some alternative embodiments a different device monitors the attack.

At task 609, endpoint 303-1 checks if the back-off interval has expired. If the interval has expired, task execution proceeds to task 610. If the interval has not expired, task execution proceeds back to task 607.

At task 610, endpoint 303-1 checks (at event 807 or 810) if the packet attack is over—that is, if there has been a sufficient mitigation in the packet attack to allow for normal heartbeat-related transmissions to resume. Endpoint 303-1 is aware of the packet attack's status, based on the monitoring performed at task 608. If the attack has mitigated sufficiently, task execution proceeds to task 611. Otherwise, task execution proceeds back to task 605, to transmit another suspend packet such as packet 808 and to receive the corresponding acknowledgment packet such as packet 809.

At task 611, endpoint 303-1 transmits packet 811 to gatekeeper 307, which packet indicates that gatekeeper 307 is to resume sending keep-alive packets to endpoint 303-1.

At task 612, endpoint 303-1 receives acknowledgment packet 812 from gatekeeper 307, in response to having transmitted the resume packet at task 611. Endpoint 303-1 itself resumes its own transmission of keep-alive packets to gatekeeper 307 and expects to receive an acknowledgment packet for each keep-alive packet transmitted. Task execution then ends.

FIG. 7 depicts a flowchart of the salient tasks that are executed by a second Internet Protocol-capable device, in accordance with the illustrative embodiment of the present invention. For pedagogical purposes, the tasks associated with FIG. 7 are described below as being performed by enhanced gatekeeper 307; however, as those who are skilled in the art will appreciate, a different device can perform the tasks as shown.

At task 701, gatekeeper 307 transmits a series of keep-alive packets to another Internet Protocol-capable device in well-known fashion; in the illustrative example, gatekeeper 307 transmits the series to endpoint 303-1.

At task 702, gatekeeper receives packet 805 from endpoint 303-1, which packet indicates that gatekeeper 307 is to suspend the transmission of additional heartbeat-related packets (keep-alive packets) to endpoint 303-1. In some embodiments, the suspend packet indicates that gatekeeper 307 is to suspend the transmission of the additional packets for a predetermined amount of time that is longer than the time between two consecutive non-retry packets in the series of keep-alive packets ordinarily sent. The length of time, in some embodiments, is based on the type of packet attack being experienced. In some other embodiments, the length of time is based on the severity of the packet attack. As those who are skilled in the art will appreciate, in still some other embodiments, the length of time can be based on yet another characteristic of the packet attack or on something else within system 300.

At task 703, gatekeeper 307 transmits acknowledgment packet 806 to endpoint 303-1, in response to having received the suspending packet at task 702.

At task 704, gatekeeper 307 refrains from transmitting additional keep-alive packets, based on having received the suspend packet from endpoint 303-1, for a particular back-off interval. The back-off interval is based on a predetermined length of time that is longer than the time between two consecutive non-retry packets in the series of keep-alive packets that are ordinarily transmitted to maintain the heartbeat with endpoint 303-1. The predetermined length of time can be based on one or more characteristics, as described above and with respect to task 605.

At task 705, gatekeeper 307 monitors for an indication to resume the transmission of keep-alive packets.

At task 706, gatekeeper 307 checks if a resume packet has been received. If a packet that indicates resumption of keep-alive transmissions has been received, task execution proceeds to task 709. Otherwise, task execution proceeds to task 707.

At task 707, gatekeeper 307 checks if another suspend packet has been received, in contrast to a resume packet. If another packet that indicates suspension of keep-alive transmissions has been received (such as packet 808), task execution proceeds to task 703. Otherwise, task execution proceeds to task 708.

At task 708, gatekeeper 307 checks if the back-off interval has expired. If the interval has expired, task execution proceeds to task 709. If the interval has not expired, task execution proceeds back to task 704.

At task 709, gatekeeper 307 resumes transmitting keep-alive packets to endpoint 303-1. Task execution then ends.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
   detecting, by a first Internet-Protocol-capable device, a packet attack that affects the first Internet Protocol-capable device; and
   transmitting via a second channel, based on the detection of the packet attack, a first packet from the first Internet Protocol-capable device to a second Internet Protocol-capable device with which the first Internet Protocol-capable device has been exchanging a plurality of heartbeat-related packets via a first channel before detecting the packet attack;
   wherein the first packet indicates that the second Internet Protocol-capable device is to suspend the transmission of additional heartbeat-related packets to the first Internet Protocol-capable device, and wherein the first channel is different than the second channel.

2. The method of claim 1 wherein the first packet indicates that the second Internet Protocol-capable device is to suspend the transmission of additional heartbeat-related packets to the first Internet Protocol-capable device for a predetermined length of time, and wherein the predetermined length of time is greater than the longest time between two consecutive packets in a series of keep-alive packets within the plurality of heartbeat-related packets.

3. The method of claim 2 wherein the predetermined length of time is based on the type of the packet attack.

4. The method of claim 2 wherein the predetermined length of time is based on the severity of the packet attack.

5. The method of claim 2 further comprising refraining, at the first Internet Protocol-capable device, from transmitting any heartbeat-related packets for an interval that is based on the predetermined length of time.

6. The method of claim 2 further comprising transmitting, after waiting for an interval that is based on the predetermined length of time, a second packet from the first Internet Protocol-capable device to the second Internet Protocol-capable device; wherein the second packet indicates that the second Internet Protocol-capable device is to continue to suspend the transmission of additional heartbeat-related packets to the first Internet Protocol-capable device.

7. The method of claim 1 further comprising:
   detecting, by the first Internet-Protocol-capable device, that the packet attack has mitigated sufficiently to allow the first Internet Protocol-capable device and the second Internet Protocol-capable device to reliably resume the exchange of additional heartbeat-related packets with each other; and
   transmitting a second packet from the first Internet Protocol-capable device to the second Internet Protocol-capable device, based on the detection of the packet attack having mitigated sufficiently;
   wherein the second packet indicates that the second Internet Protocol-capable device is to resume the transmission of additional heartbeat-related packets to the first Internet Protocol-capable device.

8. The method of claim 1 wherein the detection of the packet attack is first performed by a third Internet Protocol-capable device and communicated to the first Internet-Protocol-capable device.

9. A method comprising:
   detecting, by a first Internet-Protocol-capable device, a packet attack that affects the first Internet Protocol-capable device;
   transmitting via a second channel, based on the detection of the packet attack, a first packet from the first Internet Protocol-capable device to a second Internet Protocol-capable device with which the first Internet Protocol-capable device has been exchanging a plurality of heartbeat-related packets via a first channel before detecting the packet attack, wherein the first packet indicates that the second Internet Protocol-capable device is to suspend the transmission of additional heartbeat-related packets to the first Internet Protocol-capable device, and wherein the first channel is different than the second channel; and
   refraining, at the first Internet Protocol-capable device, from transmitting any heartbeat-related packets for an interval that is based on a predetermined length of time, wherein the predetermined length of time is greater than the longest time between two consecutive packets in a series of keep-alive packets within the plurality of heartbeat-related packets.

10. The method of claim 9 wherein the first packet indicates that the second Internet Protocol-capable device is to suspend the transmission of additional heartbeat-related packets to the first Internet Protocol-capable device for an interval that is based on the predetermined length of time.

11. The method of claim 10 wherein the predetermined length of time is based on the type of the packet attack.

12. The method of claim 10 wherein the predetermined length of time is based on the severity of the packet attack.

13. The method of claim 10 further comprising transmitting, after waiting for an interval that is based on the predetermined length of time, a second packet from the first Internet Protocol-capable device to the second Internet Protocol-capable device; wherein the second packet indicates that the second Internet Protocol-capable device is to continue to suspend the transmission of additional heartbeat-related packets to the first Internet Protocol-capable device.

14. The method of claim 9 further comprising:
   detecting that the packet attack has mitigated sufficiently to allow the first Internet Protocol-capable device and the second Internet Protocol-capable device to reliably exchange the additional heartbeat-related packets with each other; and
   transmitting a second packet from the first Internet Protocol-capable device to the second Internet Protocol-capable device, based on the detection of the packet attack having mitigated sufficiently;
   wherein the second packet indicates that the second Internet Protocol-capable device is to resume the transmission of additional heartbeat-related packets to the first Internet Protocol-capable device.

15. The method of claim 9 wherein the detection of the packet attack is first performed by a third Internet Protocol-capable device and communicated to the first Internet-Protocol-capable device.

16. The method of claim 9 wherein the first Internet Protocol-capable device is a Voice over Internet Protocol-capable endpoint.

17. A method comprising:
   exchanging a plurality of keep-alive packets via a first channel between a first Internet-Protocol-capable device and a second Internet-Protocol-capable device, wherein the plurality comprises a series of keep-alive packets transmitted from the second Internet Protocol-capable device to the first Internet Protocol-capable device;
   receiving via a second channel, at the second Internet Protocol-capable device, a first packet from the first Internet Protocol-capable device, wherein the first packet is generated in response to detecting a packet attack that affects the first Internet Protocol-capable device, and wherein the first suspend packet indicates that the second Internet-Protocol-capable device is to suspend transmitting additional keep-alive packets to the first Internet-Protocol-capable device, and wherein the first channel is different than the second channel;
   when the first packet is received, refraining by the second Internet-Protocol-capable device from transmitting an additional keep-alive packet o the first Internet Protocol-capable device for an interval that is based on a predetermined length of time that is greater than the longest time between two consecutive packets in the series of keep-alive packets; and
   transmitting an acknowledgment packet to the first Internet Protocol-capable device, in response to the receiving of the first packet.

18. The method of claim 17 wherein the first packet indicates the predetermined length of time.

19. The method of claim 17 further comprising transmitting, after waiting for the interval, the additional keep-alive packet from the second Internet Protocol-capable device to the first Internet Protocol-capable device.

20. The method of claim 17 wherein the receiving of the first packet is through a third Internet Protocol-capable device that detects a packet attack, and wherein the receiving of the first packet is based on the detection by the third Internet Protocol-capable device of the packet attack.

21. The method of claim 17 wherein the second Internet Protocol-capable device is a Voice over Internet Protocol gatekeeper.

* * * * *